US006591571B2

(12) United States Patent
Fritsche et al.

(10) Patent No.: US 6,591,571 B2
(45) Date of Patent: Jul. 15, 2003

(54) HUB ASSEMBLY FOR COLLAPSIBLE DISPLAY PANEL

(75) Inventors: Mark A. Fritsche, Eagan, MN (US); Troy S. Savoie, Burnsville, MN (US)

(73) Assignee: Skyline Displays, Inc., Eagan, MN (US)

( * ) Notice: Subject to any disclaimer, the term of this patent is extended or adjusted under 35 U.S.C. 154(b) by 0 days.

(21) Appl. No.: 09/775,877

(22) Filed: Feb. 2, 2001

(65) Prior Publication Data

US 2002/0059770 A1 May 23, 2002

Related U.S. Application Data

(60) Provisional application No. 60/179,652, filed on Feb. 2, 2000.

(51) Int. Cl.[7] .................................................. F16B 7/04

(52) U.S. Cl. .......................... 52/655.1; 52/648; 52/171; 52/176; 52/109; 52/89; 403/339; 403/340; 403/170; 403/218

(58) Field of Search ................................ 403/339, 340; 52/109, 89

(56) References Cited

U.S. PATENT DOCUMENTS 3,810,482 A * 5/1974 Beavers ...................... 135/147
3,838,703 A 10/1974 Zeigler .......................... 135/4
3,968,808 A 7/1976 Zeigler .......................... 135/4
4,026,313 A * 5/1977 Zeigler ....................... 135/143
4,276,726 A 7/1981 Derus .......................... 52/109
4,280,521 A * 7/1981 Zeigler .................... 135/120.3
4,290,244 A 9/1981 Zeigler .......................... 52/80
4,355,918 A * 10/1982 Van Vliet ................... 403/170
4,471,548 A 9/1984 Goudie ........................ 40/610
4,627,210 A 12/1986 Beaulieu ...................... 52/646
4,658,560 A 4/1987 Beaulieu ...................... 52/646
4,966,178 A * 10/1990 Eichhorn .................... 135/123
4,986,016 A 1/1991 Wichman .................... 40/610
5,074,094 A * 12/1991 Gassler ....................... 403/171
5,328,286 A * 7/1994 Lee ............................ 135/135
5,511,572 A * 4/1996 Carter ........................ 135/127
5,797,695 A * 8/1998 Prusmack ................... 135/145

* cited by examiner

*Primary Examiner*—Carl D. Friedman
*Assistant Examiner*—Basil Katcheves
(74) *Attorney, Agent, or Firm*—Patterson, Thuente, Skaar & Christensen

(57) ABSTRACT

A hub assembly for pivotally connecting the ends of support rods of a portable self-supporting display structure configured for a collapsed storage position and an expanded display position. The hub assembly may include first and second members and a connector. The first and second members are mated to provide bearing surfaces and to accommodate pivot pins affixed to the support rods. The connector secures the mated first and second members together by being extended through bores in the mated first and second members.

7 Claims, 6 Drawing Sheets

HUB ASSEMBLY FOR COLLAPSIBLE DISPLAY PANEL

This application claims the benefit of Ser. No. 60/179,652 filed Feb. 2, 2000.

BACKGROUND OF THE INVENTION

1. Field of the Invention

This invention relates generally to collapsible, self-supporting structures for displays, and more particularly to a hub assembly for pivotally holding the ends of the column-like support rods which make up the skeletal frames for such collapsible structures.

2. Background of the Invention

Collapsible structures are desirable for displays in situations where a display must be quickly erected and later collapsed. Such collapsible structures typically have a network of support rods pivotally joined together at hubs for movement between a collapsed, compact position for storage or transport and an open or erected position in which the desired structural shape is attained. Such a structure is disclosed in U.S. Pat. No. 4,658,560, issued Apr. 21, 1987 to Beaulieu and hereby incorporated by reference. This collapsible display panel includes a plurality of hub assemblies and a support and attachment brace. The support rods in these collapsible, self-supporting structures are pivotally joined by the hub assemblies. Collapsible, self-supporting dome or arch-shaped structures are disclosed by U.S. Pat. Nos. 3,838,703, 3,968,808, 4,026,313, and 4,290,244, the disclosures of which are hereby incorporated by reference. Collapsible display panel or wall structures with planar or arcuate face surfaces are disclosed by U.S. Pat. Nos. 4,276,726, and 4,471,548, the disclosures of which are hereby incorporated by reference. These collapsible display panel structures are typically covered by a sheet of material adapted for either covering the front of the panel structure or displaying a graphic representation thereon. U.S. Pat. No. 4,471,548 teaches attaching the sheet to the structure by cooperating Velcro™ and magnetic strips and corresponding hole and male fastener arrangement.

A hub assembly for a collapsible structure is disclosed in U.S. Pat. No. 4,627,210 issued Dec. 9, 1986 to Beaulieu and hereby incorporated by reference. This hub assembly pivotally holds the ends of column-like support rods, which make up the skeletal frame of a collapsible, self-supporting structure. The hub assembly includes extension caps for the ends of the support rods and a circular hub body with retaining slots or sockets, which receive and pivotally hold spherical heads of the extension caps. A circular locking disk releasably interlocks with the hub body to retain the ends of the extension caps in a pivotal relationship within the hub body. A bayonet with protrusions or knobs extends from a bottom face of the disk. The bayonet snap-locks in place to retain the extension cap spherical heads within hub body sockets. These hub assemblies interconnect support rods in a generally uniplanar pivoting relationship. One disadvantage is that if the knobs or male snap fasteners on the bayonets become worn or loose, the locking disc is likely to either loosen or become detached from the hub body. Loosened or detached locking disks may, in turn, cause the interconnected pivoting rods to become to loosely held in the hub or may collapse the structure. Moreover, this hub assembly may be more difficult to repair than desired at times. For instance, all eight support rods must be held in position when a locking disk replacement is snap-locked back in place.

U.S. Pat. No. 4,986,016, issued Jan. 22, 1991 to Wichman and hereby incorporated by reference, discloses a folding display frame with an off-set hub configuration. The collapsible framework disclosed therein is constructed of rods pivotally joined at their ends to hubs to form a self-standing unit when expanded and folding into a small set of nearly parallel rods. The expanded frame forms an array of cubicles. The hubs are designed to pivotally join the ends of four rods, with the plane defined by the pivot axes of one pair of opposing rods being off-set from the plane defined by the pivot axes of the other pair of opposed rods attached to the same hub such that the bearing surfaces of each are coplanar. One pair of rods attached to each hub can pivot on one of several pivot points on extended hub flanges, thereby providing expanded frameworks of various arcuate configurations. A stab-connection latch locks two hubs together and secures the framework in the expanded position. Folding channel bars are attached to knobs on vertically aligned hubs by key slots. The key slots of one channel bar are of progressively shorter lengths going from the top-most to the bottom-most of the vertically aligned hubs to which the bar is attached. The folding channel bars have adjustable friction-type hinge pins for controllably folding sections of the channel bars. However, repair of the display frame may be difficult. The hubs are not easily disassembled. Nor are the support rods easily separated from the hubs. Hence, extended periods of unavailability may result from difficult and time-consuming repair requirements of this display frame. Moreover, use of this display frame with damaged, worn, or otherwise defective hubs could create hazardous situations in which the erected frame could collapse. Additionally, the hubs discussed hereinabove usually include structures with metal-to-metal movement, thereby further effecting excessive wear and causing unsightly appearances.

SUMMARY OF THE INVENTION

The present invention provides a hub assembly for pivotally connecting the ends of support rods of a self-supporting structure. The self-supporting structure may be configured for a collapsed storage position and an expanded display position. The hub assembly may include a first base portion, a second portion, and an optional connector pin. The first hub base portion may include a plurality of axially extending first extensions, and the second hub portion may include a plurality of axially extending second extensions. The first and second extensions may be generally U-shaped in cross-section and when assembled define rod receiving sockets. The base may include a generally central axial opening and the second member may define an axial opening generally coaxial with the opening in the first member. The first and second members are generally matable along inboard surfaces and a connector may be configured to extend through the openings in the first and second members to secure the hub portion together.

Another significant feature and advantage of particular embodiments of this invention is that damaged hubs or rods may be easily field repaired with a minimal of expense and downtime.

A still further significant advantage and feature of particular embodiments of this invention is that portions of the hub assembly may be held together by way of frictional interlacing engagement and by way of a locking pin extending therethrough.

A yet further significant advantage and feature of particular embodiments of the invention is that the cooperating/ mating hub portions, particularly the circumferentially interlaced portions, each provide complimentary structural support to the other.

Another feature and advantage of the invention is that the hub portions engage with one another to capture the rod ends within the hub.

Another feature and advantage of particular embodiments of the invention is that the hub portions can be easily injection-molded and the rod ends attached thereto without separate fasteners such as additional pins or rivets.

Another advantage and feature of the invention is that interlaced extensions define sockets for the rod ends.

A further advantage and feature of particular embodiments of the invention is that rods extending in opposite directions from each hub have their inner bearing surface slightly offset to accommodate a bearing spacer at the intersection of pivotally attached rods extending from adjacently positioned hubs.

A further object and advantage of particular embodiments of the invention is that a variety of retention means and rod end configurations may be utilized to retain the rod ends within the hub. These retention means can include pins integral, or fixed, to the rod end, or shaped rod ends, and removable pins. Each such retention means is accommodated by variations of the hub portions according to the invention.

Another object and advantage of particular embodiments of the invention is that the display frame work can be additionally assembled and repaired without the need for special tools and without destroying parts, i.e., rivets, during removal.

Another object and advantage of particular embodiments of the invention is that placement and repair parts may be kept by the user for instant repair in the event of a component failure.

An additional feature and advantage of particular embodiments of the invention is that the easily separated hub portions may be utilized to connect additional display frameworks or additional sections to an existing collapsible structure.

DETAILED DESCRIPTION OF THE DRAWINGS

Figure 1:
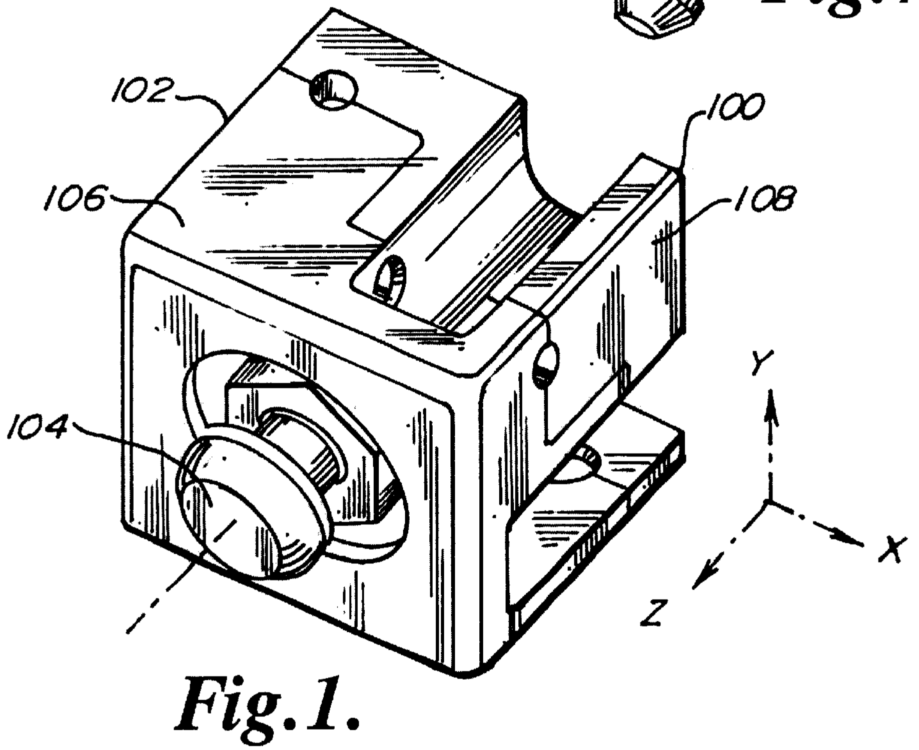
FIG. 1 is a plan view of one embodiment of the hub assembly of this invention.
Figure 3:
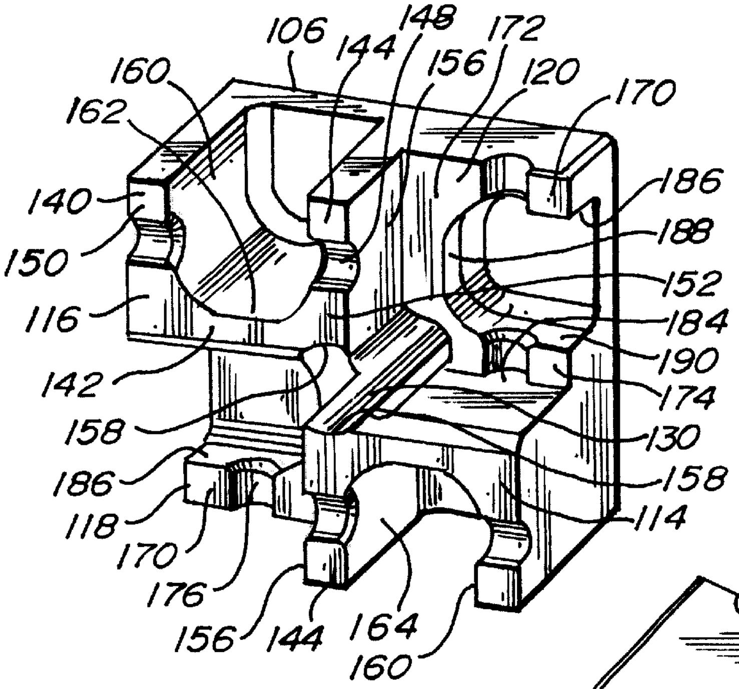
FIG. 3 is a rear perspective view of the first member of the hub assembly of FIG. 1.
Figure 2:
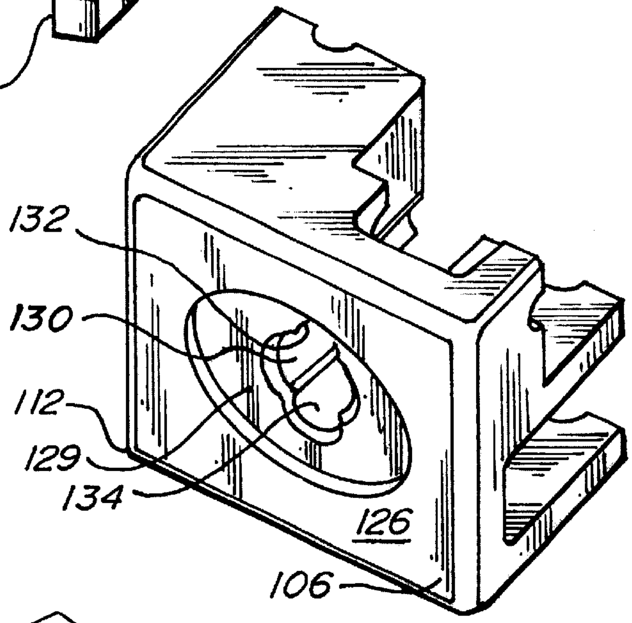
FIG. 2 is front perspective view of a first member of the hub assembly of FIG. 1.

Referring to the Figures, an exemplary hub assembly of this invention is designated generally as the numeral 100 and includes a hub 102 and a connector pin 104. Referring to FIG. 1, hub 102, in turn, may include a first (base) member 106 and a second member 108. The first member 106 may be considered to include a base 112 and diagonally disposed first socket forming extensions 114 and 116 and second socket forming extensions 118 and 120 as depicted in FIGS. 2–3. In this embodiment, the base 112 is generally square and defines an outer surface (basal datum) 126. A generally centrally disposed countersink 128 may be formed in the base 112, thereby defining a countersink surface 129. A generally central bore 130 may further be defined in base 112. Generally oppositely disposed grooves 132 and 134 may extend from bore 130.

The first extensions 114 and 116 and the second extensions 118 and 120 are generally U-shaped in cross-section and extend from the base 112. In this embodiment, the first extensions 114 and 116 are generally unitary but may be considered to include an outboard portion 140 and first and second inboard portions 142 and 144. Generally aligned notches 146 and 1483 are defined in respective end surfaces 150 and 152 of respective outboard and inboard portions 140 and 144. The first and second inboard portions 142 and 144 further display respective inboard surfaces 154 and 156. A cut-out 158, generally arcuate in cross-section, is defined at the junction of the first and second inboard portions 142 and 144 and separates inboard surfaces 154 and 156. The cut-out 158 aligns with the bore 130. The outboard portion 140 and first and second inboard portions 142 and 144 display respective inner (bearing) surfaces 160, 162, and 164.

Figure 4:
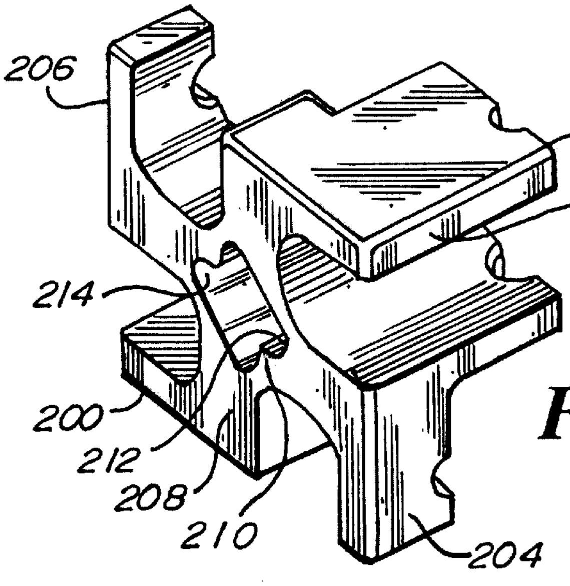
FIG. 4 is a front perspective view of the upper portion of a second member of the hub assembly of FIG. 1.

The second extensions 118 and 120 are also unitary in this embodiment, but may be considered to include an outboard portion 170 and inboard portions 172 and 174. Generally aligned notches 176 and 178 are defined proximate end surfaces 180 and 182 of the outboard and inboard portions 170 and 174. A bore 184 aligns with the notches 176 and 178 and extends into the first inboard portion 142 of each first extension 114 and 116 in this embodiment. Inner (bearing) surfaces 186, 188, and 190 are respectively displayed by the outboard portion 170, and the inboard portions 172 and 174. As shown in FIGS. 1 and 4, hub 100 may be described with respect to three-dimensional axes X, Y, and Z. Quadrants I, II, III, and IV may also be defined with respect to axes X and Y.

Figure 5:
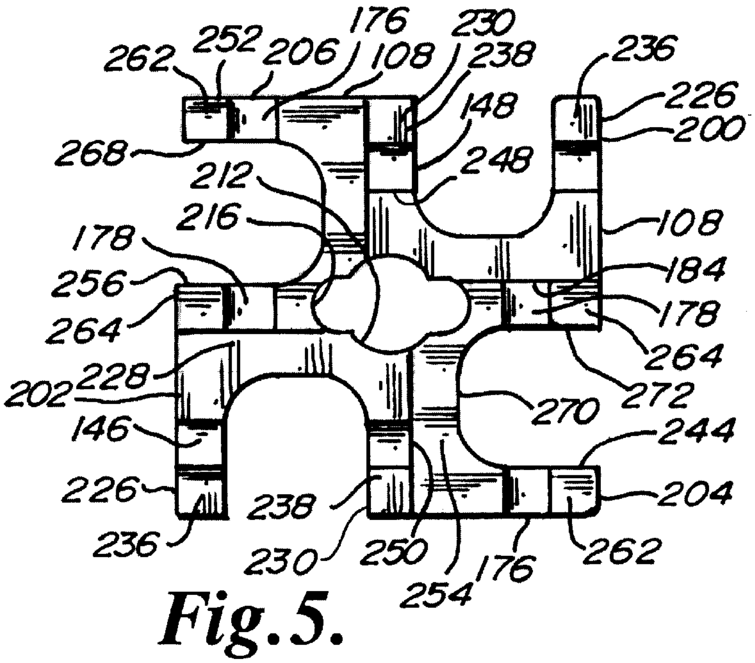
FIG. 5 is an elevational view of the inwardly facing side of the second member of the hub assembly of FIG. 1.

Second member 108 is depicted in FIGS. 4–5 and is unitary in this embodiment, but may be considered to include first extensions 200 and 202 and second extensions 204 and 206. The first extensions 200 and 202 and second extensions and 204 and 206 cooperate to display an outer surface 208 and define a generally centrally disposed bore 210. Opposed grooves 212 and 214 are further defined proximate the bore 210 in this embodiment. Opposed cut-outs 216 and 218 extend from outer surface 208 and respective grooves 212 and 214.

First extensions 200 and 202 may be considered to include outboard portion 226 and inboard portions 228 and 230. Aligned notches 146 and 148 are defined in outboard portion 226 and inboard portion 230 and extend from respective end surfaces 236 and 238. Outboard portion 226 and inboard portions 228 and 230 define respective inner (bearing) surfaces 244, 246, and 248. The inboard portions 228 and 230 display inboard surfaces 249 and 250.

Second extensions 204 and 206 may be considered to include outboard portion 252 and inboard portions 254 and 256. Notches 176 and 178 are defined and extend from end surfaces 262 and 264 of respective outboard and inboard portions 252 and 256. A bore 184 is present in inboard portion 228 on each first and second extension 202 and 204 and aligns with notches 176 and 178. Outboard portion 252 and inboard portions 254 and 256 display respective inner surfaces 268, 270, and 272.

Figure 6:
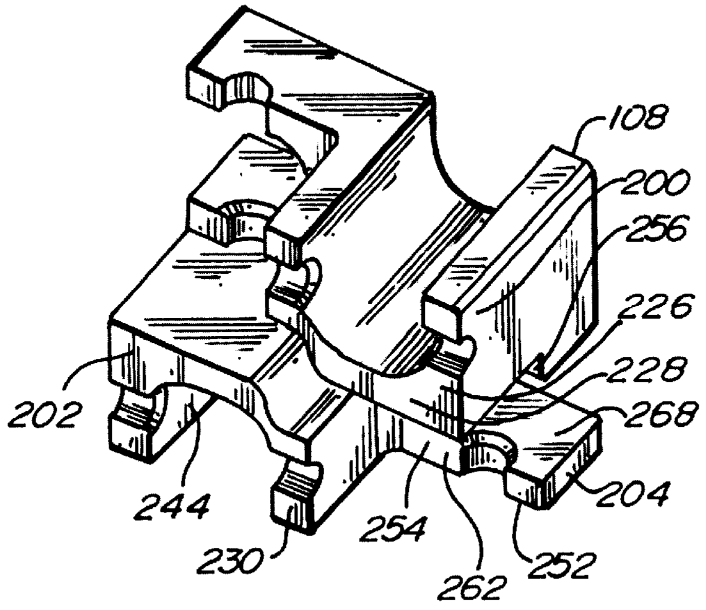
FIG. 6 is a perspective view of the second member of the hub assembly of FIG. 1.
Figure 7:
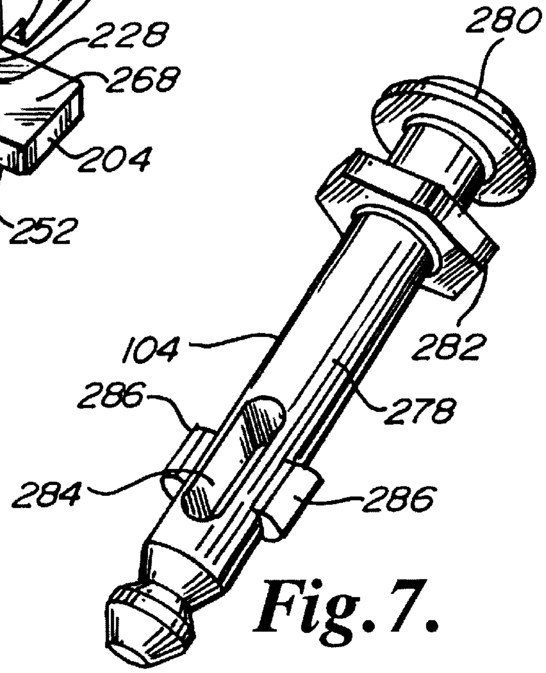
FIG. 7 is a perspective view of a connector pin of the hub assembly of FIG. 1.

Referring to FIG. 7, exemplary connector 104 includes a shank 278 extending generally centrally from a bottom edge of head 280. A hexagonal flange 282 extends from shank 278. Shank 278 defines a slot 284 and includes a pair of opposed extensions 286.

First and second members 106 and 108 may be mated whereby the respective extension members interlacing by orienting or aligning inboard surfaces 154 and 156 of first member 106 so that they will contact and slide on respective inboard surfaces 249 and 250 of second member 108. After these inboard surfaces are thus oriented or aligned, first and second members may then be mated by being pressed together until the end surfaces of aligning first and second extensions (e.g., end surfaces 150 and 262 of the first and second members 106 and 108) are in substantial abutting contact. Shank 278 of connector 104 is then extended through bore 130 such that flanges 282 are passed through slots 132 and 134. At this point, the first and second members 106 and 108 are considered to be frictionally interlaced and can be separated only by being forcefully pulled apart. Shank 278 is further extended through second member 108 until flange 282 contacts surface 129 of base 112. A retainer, such as a cotter pin, may be inserted in a portion of slot 284 extending beyond outer surface 208 of second member 108 to affix mated first and second members 106 and 108.

Figure 8:
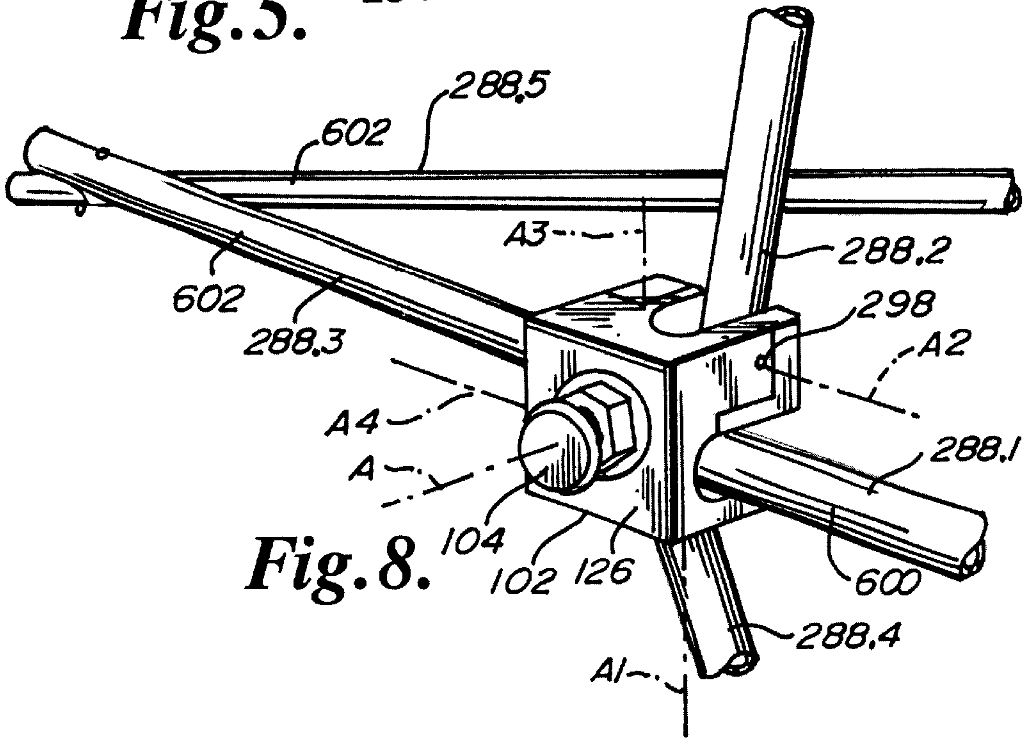
FIG. 8 is a perspective view of the hub assembly of FIG. 1 connecting four support rods in a display structure.
Figure 9:
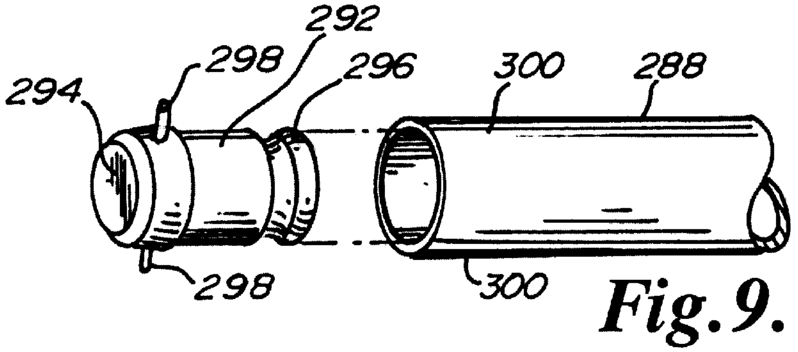
FIG. 9 is an exploded view of a support rod and connector head pivotally mountable in the hub assembly of FIG. 1.

As shown in FIGS. 8 and 9, the hub assembly 100 is advantageously used to connect four of the support rods 288 of a portable and collapsible display frame. Each rod 288 couples to a connector head 292. The connector head 292 includes a cap 294, a shaft 296 extending from the cap 294 and a pair of pivot members, such as pins 298, extending from the cap 294 as well. The pins are dimensioned and spaced to fit into two grooves of the mated first and second members as well as into the bores defined with these grooves. The rods 288 and connector heads 292 are mated by inserting shaft 296 into rod 288. The connector head may be fixed therein by a crimp 300.

Four mated rods and connector heads may be pivotably secured in the hub assembly 100. To accomplish this, the connector 104 is withdrawn from bores 130 and 210 and the first and second members are separated. Pivot member or pins 298 are placed grooves such that the connector head 298 will pivot against the inner (bearing) surfaces of the mated and substantially abutting first and second extensions when the first and second members are mated or joined as described above. One of the pins is further disposed in the bore aligned with the notches. The first and second members are then mated as described above.

As can further be seen in FIG. 8, the pins 298 pivotally attaching adjacent rods 288 may be arranged such that they are not equally spaced from the surface (basal datum) 126. In this embodiment, the pivot member attaching the rod 288.1 and 288.3 is nearer to surface 126 than the pivot member attaching adjacent rod 288.2 or 288.4. Thus rods 288.1 and 288.3 each have an axis of rotation. A1, A3 respectively, which are at the same axial position relative to the hub axis A. As can also be seen, the pivot members attaching alternate or opposing rods, e.g. 288.2 and 288.4 are equidistant from surface 126 and are axially displaced from the pivot members of rods 288.1 and 288.3. Thus, the axis of rotation A2, A4 of rods 288.2 and 288.4 are substantially coplanar and are axially displaced from the axis of rotation A1, A2 of the rods 288.1 and 288.3.

Figure 10:
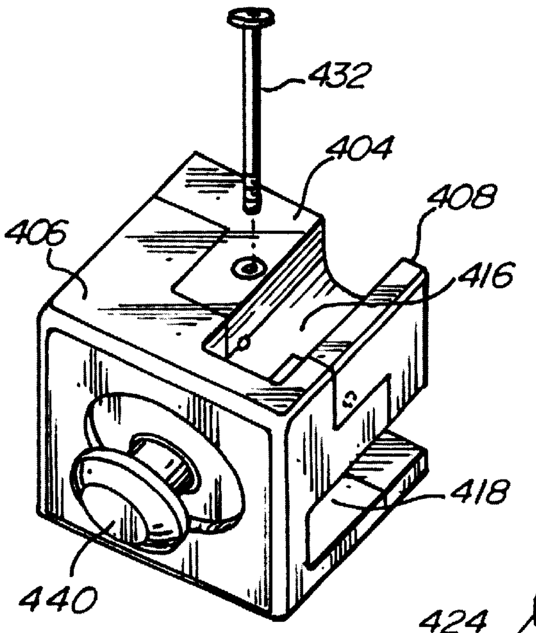
FIG. 10 is a perspective view of an alternative embodiment of a hub according to the invention.
Figure 11:
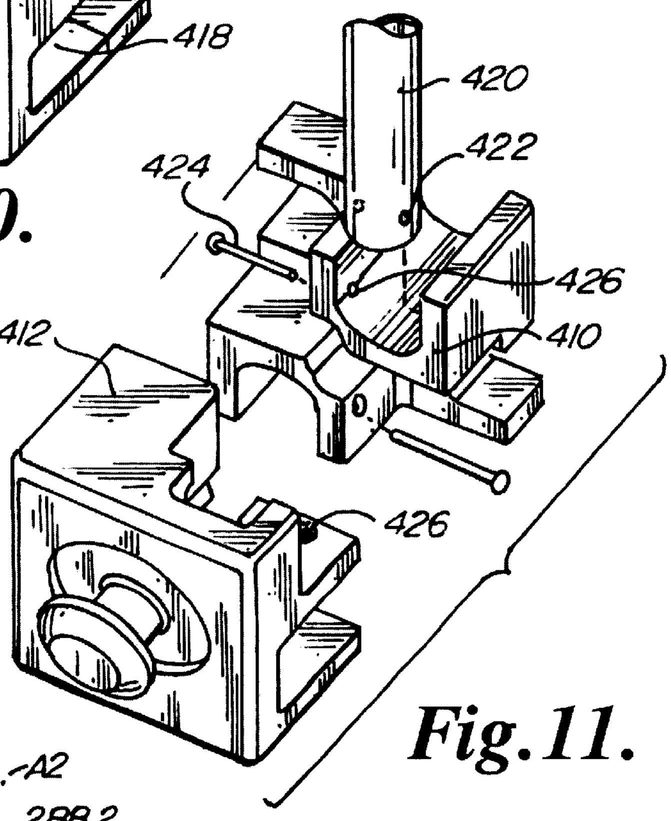
FIG. 11 is an exploded view of the hub of FIG. 10 also showing a rod end and pin.
Figure 18:
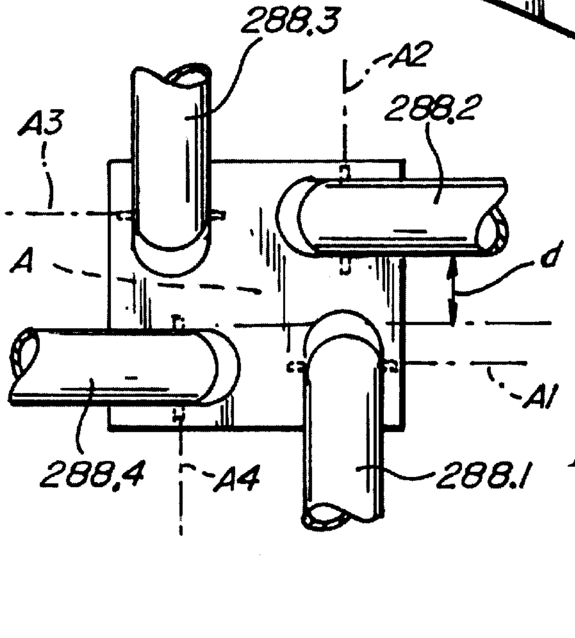
FIG. 18 is a front elevational view of a hub assembly according to the invention.

Referring to FIGS. 10 and 11, an alternative embodiment of a hub assembly according to the invention is shown. In this particular embodiment a first base portion 404 cooperatively engages with a second portion 406 to form the hub 408. Each of the hub portions include socket forming extensions 410, 412 which define the sockets when the respective hub portions are assembled. In this particular embodiment the rods 420 have a shaft hole 422 through which a pin 424 may be inserted through holes 426 in the respective hub portion to pivotally secure the rods to the hub. The holes 426 and the pivot member or pin 424 are appropriately configured such that when the two hub portions are assembled, said assembly retains the pins probably seeded within their holes 426. Thus the assembly of the hub portions with the pins and rods in place capture the rods within said hub. FIG. 10 shows an additional connector 432 which may be utilized as a connector to secure the hub portions together. Such a connector may be configured as a screw as shown or may have other embodiments such as a pin which is frictionally retained within the hub. In this embodiment shown, the head 440 which, as part of a completed display, may be functionally equivalent to the connector head 280 shown in the embodiment of FIG. 1, is integral with the second portion 406.

Figure 12:
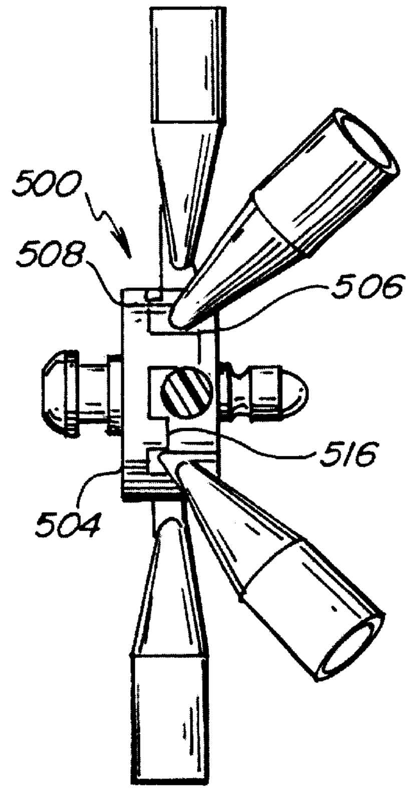
FIG. 12 is a side elevational view of an alternate hub assembly according to the invention.
Figure 13:
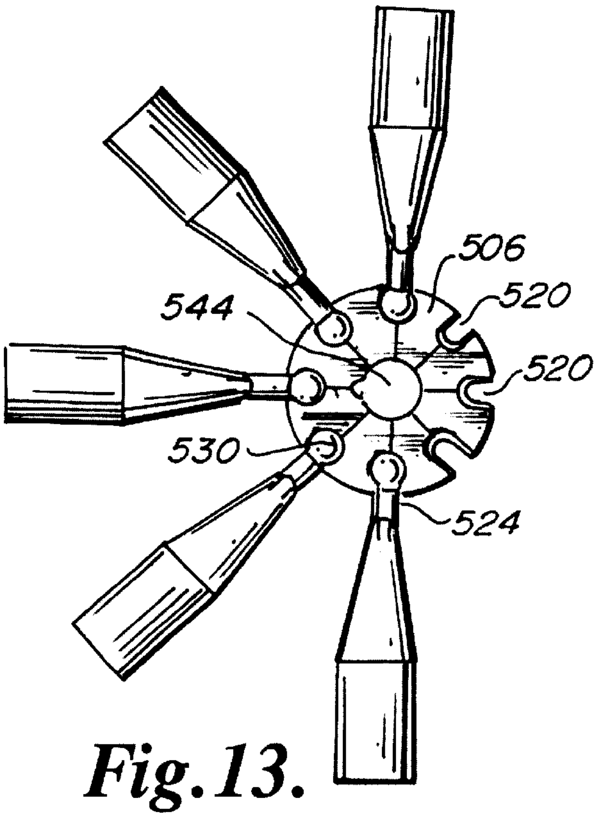
FIG. 13 is an elevational view of the rear hub member with several rods inserted therein.
Figure 16:
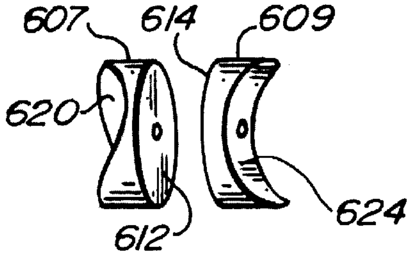
FIG. 16 is a perspective view of the bearing of FIG. 15.
Figure 14:
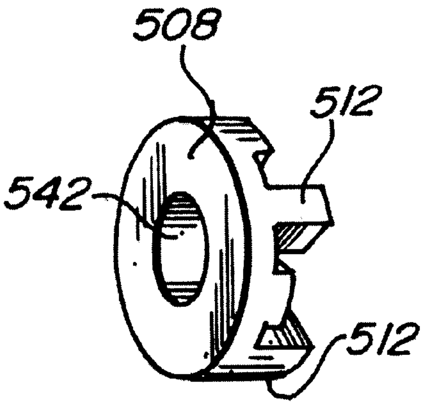
FIG. 14 is a perspective view of the front hub member of the embodiment of FIG. 12.
Figure 15:
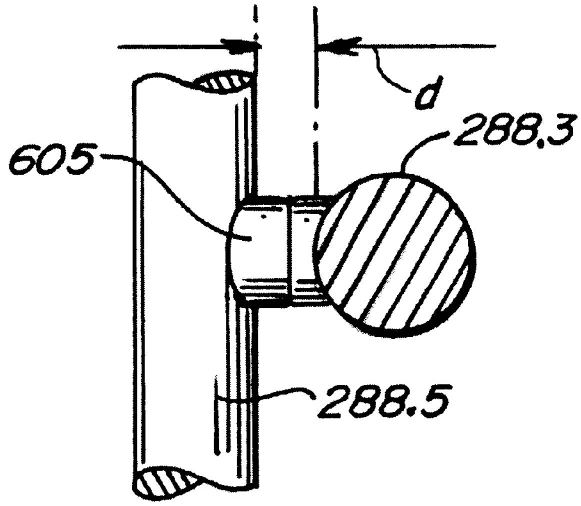
FIG. 15 is an elevational view of a bearing for pivotally connected rods.

Referring to FIGS. 12, 13, and 14, an additional embodiment of a hub assembly 500 is illustrated. In this hub assembly the hub 504 is formed from a first base portion 506 and a second portion 508 which each have extension portions 512, 516 which interlace when the first hub portion is joined to the second hub portion. The base portion 506 has a plurality of sockets 520 to receive the rod ends 524. In the embodiment of the rod shown in this view, the rod ends have balls 530 which engage within the sockets 520. When the second hub portion 508, illustrated in isolation in FIG. 14, is placed on the base with the rods inserted therein, as illustrated in FIG. 13, the rods are captured within the hub assembly. A pin such as illustrated in FIG. 7 may be inserted through the aperture 542 in the second portion and the aperture 544 in the first base portion to secure the two portions together and to thus retain the rods within the hub assembly.

Figure 17:
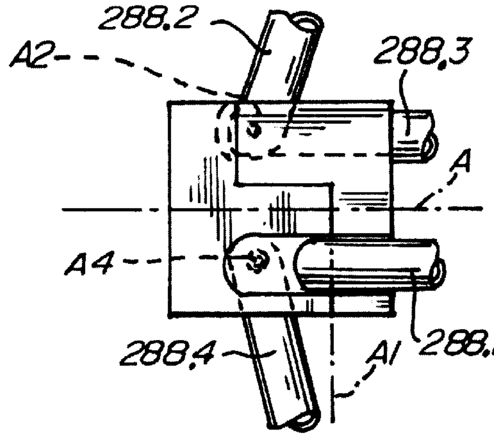
FIG. 17 is a side elevational view of a hub assembly according to the invention.
Figure 19:
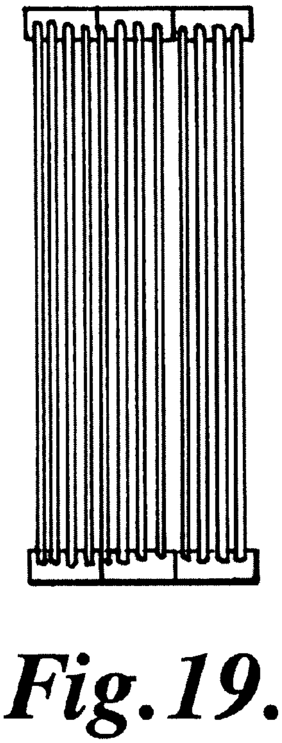
FIG. 19 is an elevational view of a display structure collapsed.

Referring to FIGS. 8, 15, 16, 17, and 19, an additional aspect of the invention is illustrated. In an expanded display, pairs of rods such as 288.3 and 288.5 are pivotally secured together as shown in FIG. 8. Each rod has an end 600 and an intermediate portion 602. The rods are pivotally connected at the intermediate section such that when the display is in an expanded configuration they criss-cross as shown in FIG. 8. When in a collapsed configuration as illustrated in FIG. 19 the pairs of rods are parallel to each other. To accommodate the slight displacement of opposing rods as illustrated in FIG. 17 and illustrated as the distance d the bearing 605 is suitably sized. The bearing 605 has two portions 607, 609 which cooperate together by way of planar surfaces 612 and 614. Concave surfaces 620, 624 engage the respective rods. The bearing and respective bearing portions may preferably be formed of high density polyethelene.

Because numerous modifications of this invention may be made without departing from the spirit thereof, the scope of this invention is not to be limited to the embodiments illustrated and described. Rather, the scope of this invention is to be determined by appended claims and their equivalents.

What is claimed is:

1. A collapsible display comprising a plurality of rods each with a pair of rod ends and a plurality of hub assemblies interconnecting the rods, each hub assembly comprising:

a first base portion, having an axis and a plurality of integral first socket forming extensions extending axially forward, the socket forming portions circumferentially spaced on the base portion around the axis, a second portion having an axis and comprising a plurality of integral second socket forming extensions extending rearwardly, the second portion coaxially joinable with the first base portion, whereby the first socket forming extensions are interlaced with, and cooperate with, the second socket forming extensions to form two pairs of oppositely positioned sockets for receiving the rod ends one pair defined primarily by the first base portion, the other pair defined primarily by the second portion.

2. The collapsible display of claim 1, wherein a pair of shaft portions on each rod end engage and pivot at a juncture between the first and second base portions.

3. The collapsible display of claim 1, wherein each rod end in each socket has a axis of rotation and wherein at Least one axis of rotation is axially displaced from another axis of rotation.

4. The collapsible display of claim 1, in which the assembly defines four sockets, a first two of said sockets axially displaced with respect a second two of said sockets.

5. The collapsible display of claim 1, in which the first and second base portions are secured together by friction.

6. The collapsible display of claim 1, in which the first and second base portions are secured together by a pin portion extending through both the first and second base portions.

7. A hub assembly for connecting a plurality of rod ends of a collapsible display, each rod end having a pair of shaft portions perpendicular to the rod axis, and extending outwardly from the respective rod end, the hub assembly comprising:

a first base portion, having an axis;

a second portion having an axis, the second portion coaxially joinable with the first base portion into a fully engaged position to form a plurality of socket pairs circumferentially spaced around a coaxis, the sockets each sized for releasably receiving a rod end, each socket pair having pivot members with coplanar axis of rotations of their respective rods at the same axial position with respect to the coaxis, whereby when the first base portion and second portion are in their fully engaged position with rod ends inserted in the sockets, each rod end is captured in the hub assembly and wherein the axial positions, with respect to the coaxis, of one of the socket pairs is axially displaced from the axial position, with respect to the coaxis, of at least one other socket pair, and wherein each of the rod ends are removable from the hub assembly when the first base portion is separated from the second portion.

* * * * *